United States Patent [19]
Inglis et al.

[11] Patent Number: 5,457,414
[45] Date of Patent: Oct. 10, 1995

[54] POWER SUPPLY LOSS SENSOR

[75] Inventors: David A. Inglis, Long Branch, N.J.; Hyun Lee, Allentown, Pa.

[73] Assignee: AT&T IPM Corp., Coral Gables, Fla.

[21] Appl. No.: 994,732

[22] Filed: Dec. 22, 1992

[51] Int. Cl.$^6$ .............................. H03K 5/153; G05F 1/10
[52] U.S. Cl. ............................. 327/77; 327/63; 327/544; 327/545
[58] Field of Search ................................... 307/355, 362, 307/296.5, 296.3, 296.1, 66; 365/229; 327/63, 68, 77, 535, 538, 544, 545

[56] References Cited

U.S. PATENT DOCUMENTS

| | | |
|---|---|---|
| Re. 32,200 | 7/1986 | Lee et al. . |
| 4,122,359 | 10/1978 | Breikss . |
| 4,422,163 | 12/1983 | Oldenkamp . |
| 4,451,742 | 5/1984 | Aswell . |
| 4,463,270 | 7/1984 | Gordon . |
| 4,549,100 | 10/1985 | Spence .................................. 307/362 |
| 4,730,121 | 3/1988 | Lee et al. . |
| 4,754,160 | 6/1988 | Ely ........................................... 307/64 |
| 4,845,383 | 7/1989 | Iida ......................................... 307/355 |
| 4,884,242 | 11/1989 | Lacey et al. . |
| 4,908,790 | 3/1990 | Little et al. . |
| 4,989,261 | 1/1991 | Lee . |
| 4,996,453 | 2/1991 | Zanders et al. . |
| 5,058,075 | 10/1991 | Mizuta . |
| 5,168,206 | 12/1992 | Jones ....................................... 365/229 |
| 5,187,396 | 2/1993 | Armstrong et al. ................. 307/296.1 |
| 5,233,748 | 6/1993 | Mumper et al. ......................... 307/64 |
| 5,254,888 | 10/1993 | Lee et al. ................................ 307/480 |
| 5,280,198 | 1/1994 | Almulla .................................. 307/355 |

FOREIGN PATENT DOCUMENTS

| | | | |
|---|---|---|---|
| 0269767 | 5/1988 | European Pat. Off. ........... H02J 7/34 |

OTHER PUBLICATIONS

National Semiconductor Publication, Low Voltage Databook, 1992 Edition, "LV8572A Low Voltage Real Time Clock (RTC)", pp. 3-47 through 3-63.

Electronique Applications. Voire Bureau 23.12 M. Mees. No. 64, Mar. 1989, Paris Fr, pp. 35-39, J.J. Lazar "Circuit d'horloge temps reel de seconde generation".

Database WPI, Week 9243, Derwent Publications Ltd., London, GB;AN 92-351243 & EP-A-0 509 585 (Philips Gloeilampenfab NV) 21 Oct. 1992, abstract.

Database WPI, Week 8432, Derwent Publications Ltd., London, GB; AN 84-201253 & US-A-4 461 965 (Nat Semiconductor Inc) 24 Jul. 1994, abstract.

European Search Report dated 30 Mar. 1994.

*Primary Examiner*—John S. Heyman
*Assistant Examiner*—Toan Tran
*Attorney, Agent, or Firm*—James H. Fox

[57] ABSTRACT

A clocked comparator circuit compares the primary and backup power supply voltages to a system. When the primary voltage falls a given amount below the backup, the circuit provides a signal that may be used to switch to the backup power supply. When the primary voltage is again present, the circuit can switch back to primary power. Alternatively, or additionally, a signal may be generated to initiate graceful shutdown of the system. The clock to the comparator typically operates at a higher frequency when operating on the primary voltage, and a lower frequency when operating on the backup voltage. This circuit is typically used with a portable system that uses a rechargeable battery as its primary power supply. The backup power supply may be a long-life battery that provides power to only a portion of the system. For example, in a computer, only a static memory may be powered by the backup, to allow the full system to retain its proper configuration when the primary power supply is again activated. The circuit may be implemented with all digital logic, typically CMOS, thus minimizing power dissipation and increasing its versatility.

29 Claims, 3 Drawing Sheets

POWER SUPPLY LOSS SENSOR

BACKGROUND OF THE INVENTION

1. Field of the Invention

The present invention relates to a power supply loss sensor.

2. Description of the Prior Art

Battery-operated electronic devices are becoming increasingly sophisticated, with microprocessors and other types of integrated logic circuitry being used in a variety of portable, mobile, and other applications. Often a primary battery is used in normal operation, with a backup battery retaining essential data and circuit functions when needed; for example, when the primary battery becomes too weak to function, or when the primary battery is being replaced. Referring to FIG. 8, data corruption or system malfunction due to loss of the primary battery (80) is commonly prevented by using a "diode-switch" method. This method uses two diodes (81,82) external to the system device (e.g., integrated circuit 83), and connected so that one diode is reverse biased while the other diode is forward biased. This type of solution is acceptable if the voltage level of $V_{DD}$ is high enough so that a diode voltage drop from $V_{DD}$ will still provide a solid power supply voltage to the system, which is usually true if $V_{DD}$ is 5 V (plus or minus 10 percent). However, in the case of a 3 V (plus or minus 5 percent) $V_{DD}$, using this method, the power supply voltage to the integrated circuit 83 is in the range of only 2.2 V to 2.5 V (i.e., $V_{DD}$ minus the diode voltage drop). This level of power supply voltage (2.2 V to 2.5 V) may degrade the performance of a logic circuit to a point which is not acceptable. For example, the speed degradation due to the lowering of the power supply from 3 V to 2.2 V is typically a factor of 2.

One method of reducing the voltage loss across a diode is to switch between the batteries with transistors. For example, U.S. Pat. No. 4,451,742 shows one such circuit. However, in the voltage loss detector discloses therein, analog circuitry is used to compare the primary power supply to one (or more) backup batteries. Hence, an analog process technology is required when implementing the circuit in integrated circuit form. Furthermore, the disclosed circuitry may also result in significant current drain on the power supply. In another example, the use of an analog comparator in a battery switch-over circuit is shown in the Low Voltage Databook of National Semiconductor, 1992 Edition, at page 3–57.

SUMMARY OF THE INVENTION

We have invented a technique for detecting loss of a power supply voltage. A first power supply voltage from a first source is compared to a second power supply voltage from a second source. The comparison is accomplished in a clocked comparator, which may be implemented in CMOS technology. In a preferred embodiment, the clock rate is higher when operating from the first (e.g., primary) power source than when operating from a lower-voltage second (e.g., backup) power source.

DETAILED DESCRIPTION

The following detailed description relates to a technique and circuit for detecting the loss of a power supply voltage in a system that includes a primary and a backup power supply. One or both of the power sources are typically batteries; for example, a rechargeable battery may be the primary power source, and a long-life battery (e.g., lithium or alkaline) may be the backup, with other power sources being possible. The loss sensor detects a gradual degradation or total loss of $V_{DD}$, the primary power supply to the system. In a presently-preferred embodiment, either the primary power supply or the backup power supply can be removed from the system at any time and the circuit will maintain power to a selected portion of a system, using the remaining power supply. The loss sensor circuit shown in the illustrative embodiment is designed with all-digital logic, thus minimizing power dissipation and increasing its versatility. That is, this circuit can be fabricated with either a digital or analog integrated circuit fabrication process. The functional description of an illustrative embodiment of a system employing the inventive technique follows.

Figure 1:
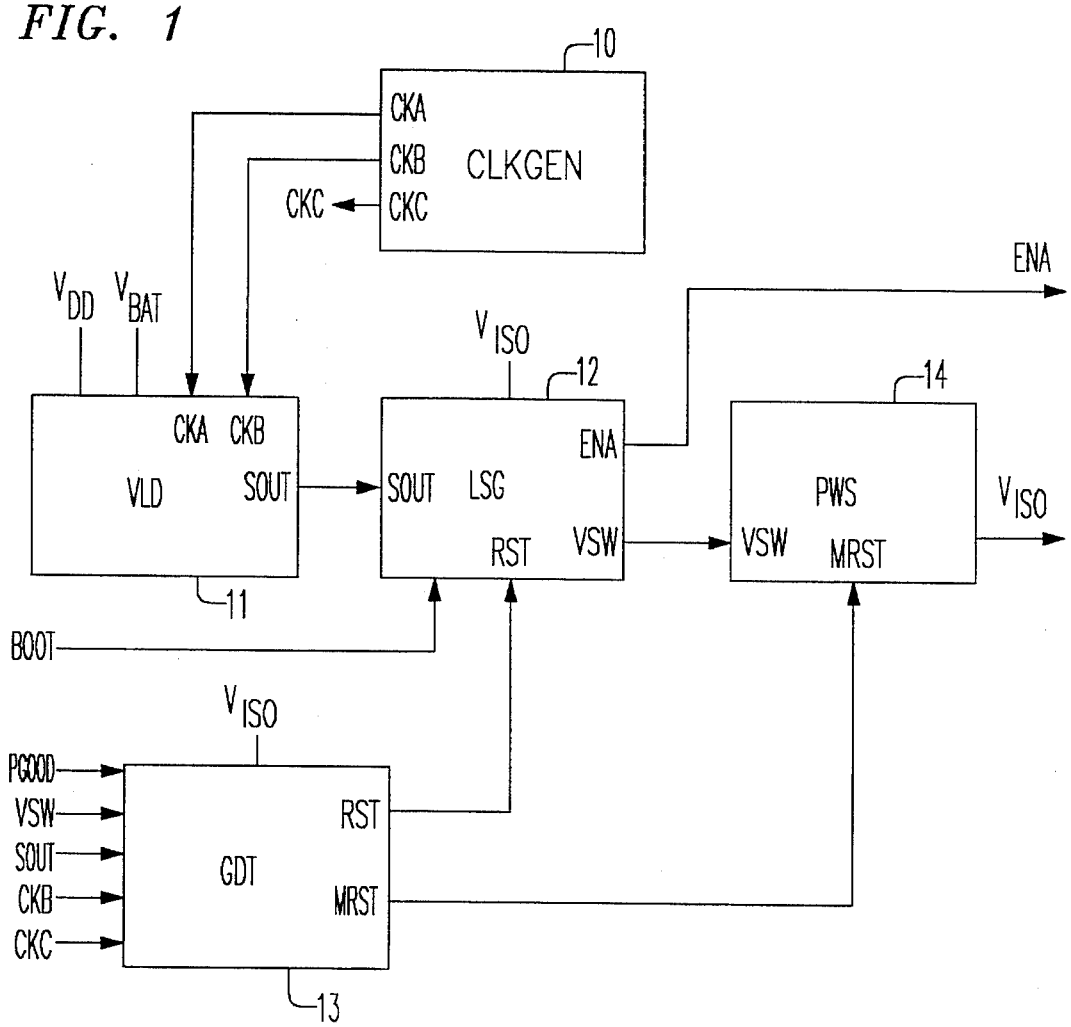
FIG. 1 shows a block diagram of an embodiment of the invention.
Figure 2:
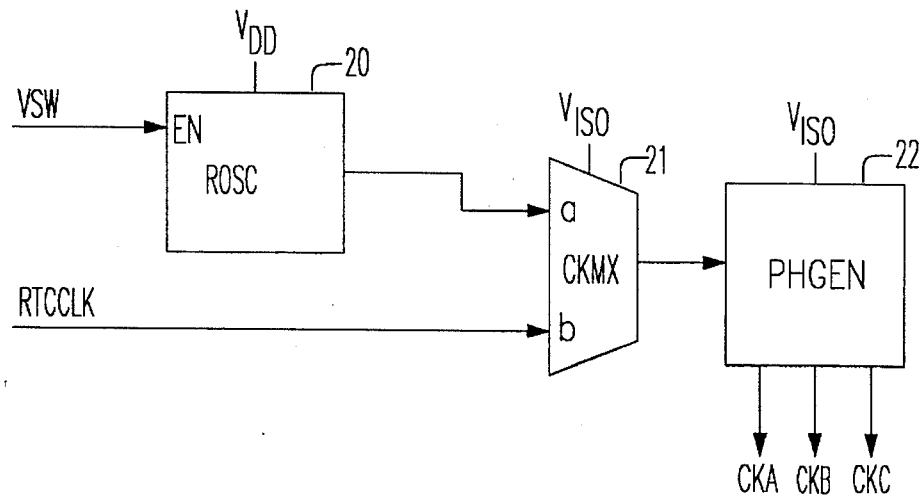
FIGS. 2 through 7 shows circuitry suitable for implementing the block diagram of FIG. 1.

Referring to FIG. 1, a block diagram of an illustrative embodiment of the invention is shown. During normal operation, the loss sensor samples $V_{DD}$ (primary power source) at a given rate and compares this with $V_{BAT}$ (backup battery source). If $V_{DD}$ is lower than $V_{BAT}$ a warning signal (ENA) is set, to indicate this condition, and the loss sensor output ($V_{ISO}$) is switched to draw power from $V_{BAT}$ rather than $V_{DD}$. Power to data-critical portions of a device, for example a memory containing system privileges information, can be maintained using this circuit. The generated warning signal may be timed such that a system can be gracefully shut down prior to switching to $V_{BAT}$. The illustrative circuit embodiment includes 5 logic blocks. They are the CLKGEN (Clock Generator) 10, VLD ($V_{DD}$ Loss Detector) 11, LSG (Loss of Signal Generator) 12, GDT (Glitch Detector) 13, and PWS (Power Switch) 14. The voltage $V_{ISO}$ powers all the devices in the LSG and GDT blocks (12,13) as indicated. Power to the devices in the other blocks is supplied from either $V_{DD}$, $V_{BAT}$, or $V_{ISO}$ as indicated in the other Figures, with $V_{SS}$ being the common negative voltage. Circuits suitable for implementing these functions are as follows:

1. CLKGEN (Clock Generator):

Referring to FIG. 2, CLKGEN consists of ROSC (Ring Oscillator) 20, CKMX (Clock Mux) 21, and PHGEN (Phase Generator) 22. ROSC is a low power gated ring oscillator which generates a raw clock input to PHGEN. The frequency of ROSC is primarily controlled by the number and size of inverters in the oscillator loop, along with setting the value of variable capacitors. A secondary control over the ROSC frequency is obtained through variation of the primary power supply, $V_{DD}$. Signal VSW, an output of the LSG block, is used to gate ROSC on and off. CKMX selects between the high-speed clock signal generated by ROSC and a low-frequency clock, RTCCLK, which in the illustrative-embodiment is generated externally. During normal operation ($V_{DD}$ valid) ROSC is selected. The frequency of ROSC is typically greater than 1 MHz, and illustratively 10 MHz. This relatively high frequency provides for rapid detection of loss of the primary power supply, so that the system may switch over to the backup supply without loss of vital data or system parameters. The low frequency input RTCCLK is selected during low-power standby modes and periods of $V_{DD}$ loss; i.e., when operating from the backup power supply ($V_{BAT}$). In a typical case the low frequency input RTCCLK provides a signal of less than 1 Mhz, and illustratively about 32 KHz. This relatively low frequency provides for low-power consumption of the sensor circuit when operating from $V_{BAT}$. PHGEN receives a raw clock from CKMX and produces three clocks, CKA, CKB and CKC. Note that CKA and CKB are overlapping in the low voltage state, in order to compare $V_{DD}$ and $V_{BAT}$, as discussed below. The frequency of these clocks dictates the sampling rate of both the $V_{DD}$ power supply and $V_{BAT}$ power supply.

Figure 3:
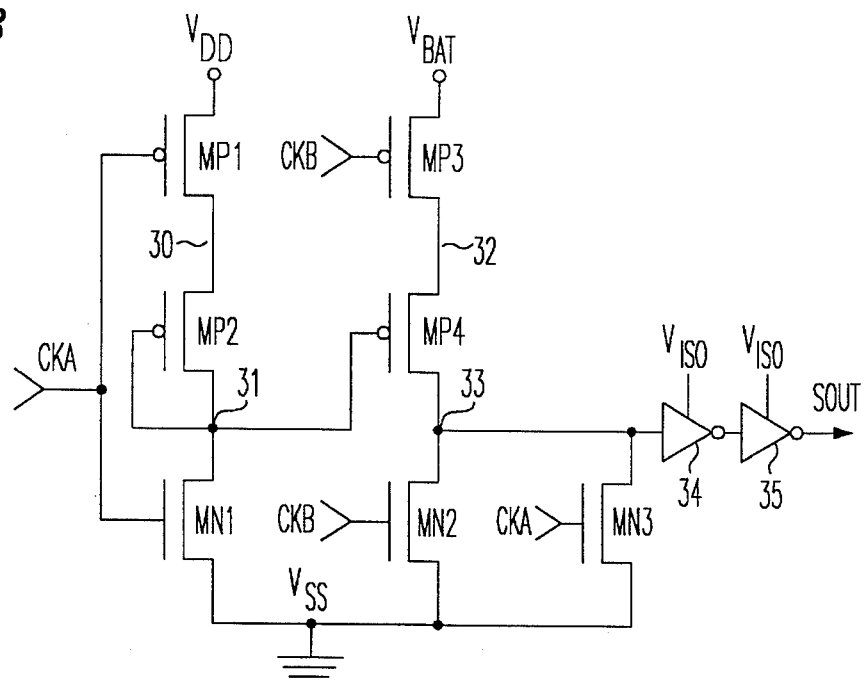
Figure 4:
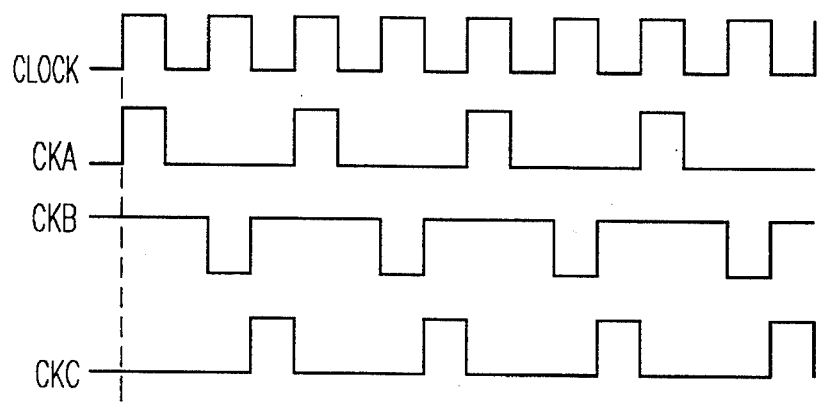

2. VLD ($V_{DD}$ Loss Detector):

Referring to FIG. 3, the sampling section of the loss sensor circuit (VLD) is illustrated, with the clock waveforms being illustrated in FIG. 4. At initialization, node SOUT is low, indicating that $V_{DD}$ is greater than $V_{BAT}$. CKA pulses high (logic one) each sampling period, causing pull-down transistor MN1 to conduct while preventing pull-up transistor MP1 from conducting, to clear node 31 by placing it at $V_{SS}$. When CKA goes low (logic zero), $V_{DD}$ is sampled through MP1. The sampled voltage (appearing at node 30), minus a threshold of voltage-dropping transistor MP2, is stored at node 31. When CKA is high, CKB is also high, preventing pull-up transistor MP3 from conducting, and allowing pull-down transistor MN2 to conduct, so that node 33 is pulled low, thereby resetting it. While CKA is low and CKB is low both $V_{DD}$ and $V_{BAT}$ are sampled. If the voltage stored at node 31 drops more than a p-channel transistor threshold below the voltage at node 32, switching device MP4 will turn on and pull node 33 up toward $V_{BAT}$. However, since clock CKB is relatively short compared to CKA, node 33 does not necessarily reach $V_{BAT}$ during a single clock cycle. As the voltage at node 31 continues to fall, node 33 is pulled up more strongly; this effect helps to avoid false triggering of the signal SOUT.

When node 33 reaches the switching point of the first inverter 34, SOUT will be pulled high by inverter 35. SOUT goes to the input of the LSG (Loss of Signal Generator), causing the generation of signals ENA and VSW, which switches the voltage $V_{ISO}$ from the main power supply to the backup, as discussed below. The amount (Δ) by which $V_{DD}$ must fall below $V_{BAT}$ in order for SOUT to be pulled high is determined by the size of transistor MP4 and the duration of CKB. For reasons noted above, it is desirable to minimize Δ, and the present technique readily allows for Δ to be less than or equal to 150 millivolts. In a typical implementation, Δ=50 millivolts.

Figure 5:
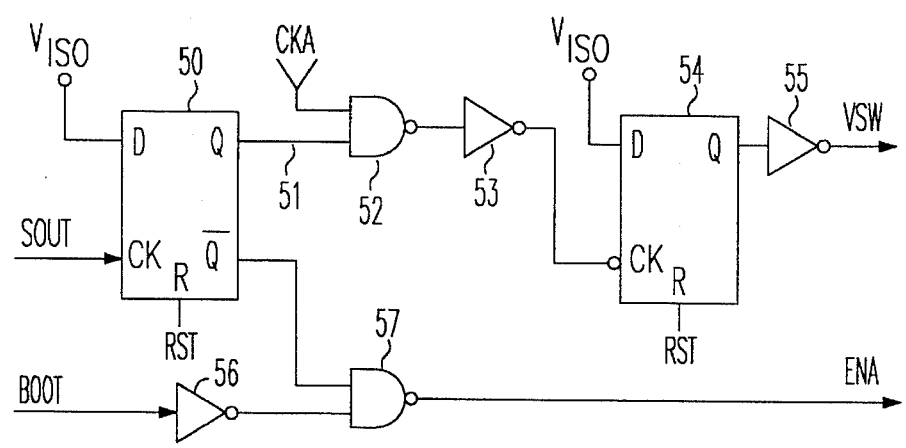

3. LSG (Loss of Signal Generator):

Referring to FIG. 5, the Loss of Signal Generator (LSG) receives SOUT from VLD and produces signals VSW (switch control to PWS) and ENA ($V_{DD}$ loss warning signal). Latch 50 uses SOUT as its clock to capture the current result of the $V_{DD}$ and $V_{BAT}$ comparison. The Q output node 51 of latch 50 is normally low after initialization and goes high when triggered by SOUT. When clocked by CKA through NAND gate 52, the high SOUT delivers a clock signal through inverter 53 to latch 54. Depending on the the state of the BOOT signal, ENA will either be high already or will go high sometime after node 51 goes high, due to the action of inverter 56 and NAND gate 57. VSW, the output of latch 54 through inverter 55, will be high during normal operation (i.e. $V_{DD}$ greater than $V_{BAT}$). VSW is the signal indicating the loss of $V_{DD}$ (or $V_{DD}$ less than $V_{BAT}$) and a valid signal is produced a sampling period after loss of $V_{DD}$ is detected. This delay is optionally provided for applications which require that output ENA be valid some amount of time prior to output VSW changing state. Thus, ENA may be used to set the system to a power-down state before the power source is switched from $V_{DD}$ to $V_{BAT}$.

VSW is used as a loss of $V_{DD}$ indicator to the GDT block 13 and also as a switch control signal to the PWS block 14. The power supply to the LSG block is $V_{ISO}$, the output of the Power Switch (PWS) block. Both latches 50 and 54 have a reset pin R which is used to reset node 51 to zero and VSW high, respectively, during glitch recovery.

Figure 6:
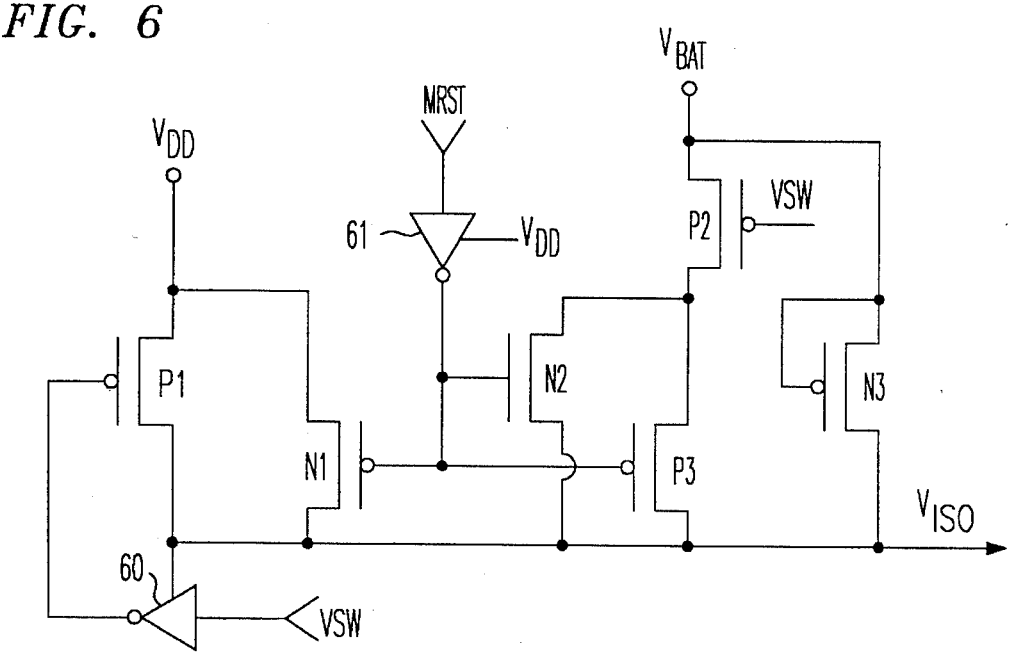

4. PWS (Power switch):

Referring to FIG. 6, the main components of this logic block are inverters 60, 61 and two large power PMOS transistors, P1 and P2. Transistors N1, N2, N3 and P3 are present to ensure that $V_{ISO}$ initializes correctly. Transistors P1 and P2 are used as power switches and the inverters are used to generate complementary control signals. $V_{ISO}$ is electrically connected to $V_{DD}$ through transistor P1 when the voltage level of $V_{DD}$ is higher than that of $V_{BAT}$. Otherwise, $V_{ISO}$ is electrically connected to $V_{BAT}$ through transistor P2, as follows: The source nodes of P1 and P2 are connected to $V_{DD}$ and $V_{BAT}$ respectively. When the input VSW of this section (from the LSG block) is high, i.e. $V_{DD}$ is higher than $V_{BAT}$, P1 is on and P2 is off, thus connecting $V_{ISO}$ to $V_{DD}$. Conversely, if VSW is low, P1 is off and P2 and P3 are on, thus electrically connecting $V_{ISO}$ to $V_{BAT}$. The delay through inverter 60, from turn-on of P2 to turn-off of P1, ensures glitch-free switching of $V_{ISO}$ due to the fact that $V_{ISO}$ is never isolated from both $V_{DD}$ and $V_{BAT}$ at the same time. Transistors P3 and N3 ensure that $V_{ISO}$ will still initialize correctly while avoiding the disadvantageous condition of $V_{DD}$ back-driving $V_{BAT}$.

Figure 7:
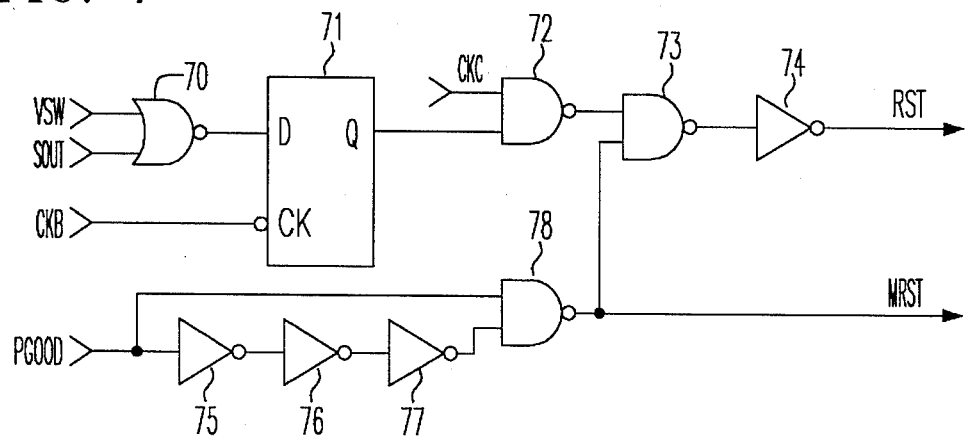
Figure 8:
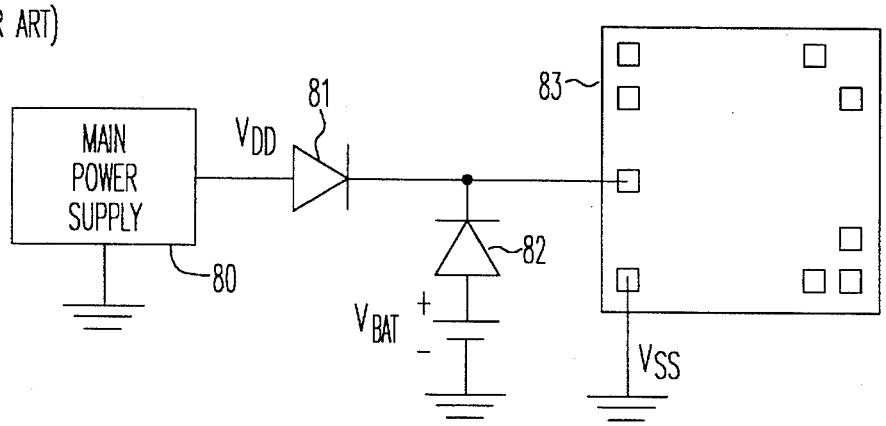
FIG. 8 shows a prior-art battery backup technique.

5. GDT (Glitch detector):

Referring to FIG. 7, the glitch detector (GDT) block provides the master reset signal MRST for the loss sensor as well as reset generation signal RST upon a glitch detection or noise spike on $V_{DD}$. Any $V_{DD}$ glitch above the $V_{BAT}$ voltage level is masked by GDT. The master reset signal MRST is used to initialize the PWS block (FIG. 6). A negative master reset pulse MRST, is generated on the rising edge of the initialization input, PGOOD, by the delay action of inverters 75, 76 and 77, and NAND gate 78. In addition, a negative reset pulse RST is generated from PGOOD by the additional action of NAND gate 73 and inverter 74. The signal PGOOD may be externally supplied from a microcontroller when coming out of a power-down mode, for example, or from other means. The GDT block also generates a reset pulse RST to the LSG block if a glitch is detected on $V_{DD}$. This condition is detected if, in any sampling period, node VSW has been set low by the LSG and SOUT is also low. If a glitch occurred on the $V_{DD}$ input then VSW would be low and SOUT would be high resulting in a low output from gate 70. This low output is latched by 71 and no reset pulse is generated in the same sampling period that the glitch occurred. If, in the subsequent sample period, the glitch is no longer present then both VSW and SOUT will be low. CKB would then clock the high output of gate 70 into latch 71. The output of latch 71 is qualified by by NAND gate 72 according to CKC (FIG. 4) to generate a low reset pulse (RST low). This pulse resets VSW back to high (FIG. 5), indicating that the $V_{DD}$ is greater than $V_{BAT}$. In summary, the RST signal is normally high, but goes low after 2 clock cycles when $V_{DD}$ goes greater than $V_{BAT}$.

The $V_{DD}$ loss warning signal (ENA) may be utilized by a user to initiate graceful shut down of a system. The loss sensor is especially well suited for 3 V systems where a 0.7 V diode drop in the power supply voltage cannot be tolerated. The circuit may be readily integrated with a wide range of integrated circuit fabrication technologies, and typically does not require special processing steps or design requirements in the CMOS implementation shown. As indicated above, the loss sensor circuit may be used in providing a supply voltage to a system at a level Δ which is only slightly below $V_{DD}$, thereby helping to ensure an adequate power supply voltage margin. The voltage $V_{ISO}$ may be provided to power one or more integrated circuits. However, it is desirable in many cases to provide $V_{ISO}$ to only a portion of an integrated circuit where critical information is stored. For example, providing $V_{ISO}$ to a static memory portion of an integrated circuit allows for system parameters or other information to be stored during the loss of main power ($V_{DD}$), thereby allowing for resumption of normal operation of the integrated circuit (or system) when main power is restored.

We claim:

1. An integrated circuit having a first input for receiving a first power supply voltage from a first source, and a second input for receiving a second power supply voltage from a second source; and including a clocked comparator for comparing the first and second power supply voltages and providing a comparator output signal; and also including a clock provider that depends on the relative values of said first power supply voltage and said second power supply voltage to provide a clock signal to said comparator at a high clock rate when said first power supply voltage exceeds said second power supply voltage, and at a low clock rate when said second power supply voltage exceeds said first power supply voltage by a given amount.

2. The circuit of claim 1 wherein said high clock rate is greater than 1 megahertz, and said low clock rate is less than 1 megahertz.

3. The integrated circuit of claim 1 wherein said first source is a main battery, and said second source is a backup battery.

4. The integrated circuit of claim 1 wherein said given amount is 150 millivolts or less.

5. The integrated circuit of claim 1 wherein said clocked comparator comprises:

(1) a first pull-up transistor serially connected between said first input and a first voltage-dropping means, with said voltage-dropping means being serially connected to a first pull-down transistor at a first node, with the control terminals of the first transistors being coupled to a first clock phase source;

(2) a second pull-up transistor serially connected between said second input and a switching transistor, with said switching transistor being serially connected to a second pull-down transistor at an output node, with the control terminals of the second transistors being coupled to a second clock phase source, and with the control terminal of the switching transistor being coupled to said first node.

6. The integrated circuit of claim 5 wherein said first and second pull-up transistors are p-channel transistors, and said first and second pull-down transistors are n-channel transistors.

7. The integrated circuit of claim 6 wherein said first voltage-dropping means and said switching means are p-channel transistors.

8. A system including a primary power source that supplies a first power supply voltage, and a backup power source that supplies a second power supply voltage, and further including a circuit having a first input for receiving said first power supply voltage, and a second input for receiving said second power supply voltage; wherein said circuit includes a clocked comparator for comparing the first and second power supply voltages and providing a comparator output signal; and also including a clock provider that depends on the relative values of said first power supply voltage and said second power supply voltage to provide a clock signal to said comparator at a high clock rate when said first power supply voltage exceeds said second power supply voltage, and at a low clock rate when said second power supply voltage exceeds said first power supply voltage by a given amount.

9. The circuit of claim 8 wherein said high clock rate is greater than 1 megahertz, and said low clock rate is less than 1 megahertz.

10. The system of claim 9 wherein said first source is a main battery, and said second source is a backup battery, wherein said first power supply voltage exceeds said second power supply voltage in normal operation of said circuit.

11. The system of claim 10 wherein said given amount is 150 millivolts or less.

12. The system of claim 8 wherein said clocked comparator comprises:

(1) a first pull-up transistor serially connected between said first input and a first voltage-dropping means, with said voltage dropping means being serially connected to a first pull-down transistor at a first node, with the control terminals of the first transistors being coupled to a first clock phase source;

(2) a second pull-up transistor serially connected between said second input and a switching transistor, with said switching transistor being serially connected to a second pull-down transistor at an output node, with the control terminals of the second transistors being coupled to a second clock phase source, and with the control terminal of the switching transistor being coupled to said first node.

13. The system of claim 12 wherein said first and second pull-up transistors are p-channel transistors, and said first and second pull-down transistors are n-channel transistors.

14. The system of claim 13 Wherein said first voltage-dropping means and said switching means are p-channel transistors.

15. A voltage comparator circuit comprising:

(1) a p-channel transistor having its source connected to a first power supply voltage conductor from a first source, its drain connected to the source of a voltage-dropping p-channel transistor, and its gate connected to means for generating a first clock phase;

(2) an n-channel transistor having its drain connected to the gate and drain of said voltage-dropping transistor, its source connected to a common power supply voltage conductor, and its gate connected to said means for generating a first clock phase;

(3) a p-channel transistor having its source connected to a second power supply voltage conductor from a second source, its drain connected to the source of a switching p-channel transistor, and its gate connected to a means for generating a second clock phase;

(4) an n-channel transistor having its drain connected to the drain of said switching transistor at an output node, its source connected to said common power supply voltage conductor, and its gate connected to said means for generating a second clock phase;

and wherein the gate of said switching transistor is connected to the drain of said voltage-dropping transistor.

16. The circuit of claim 15 wherein the low voltage state of said first clock phase overlaps the low voltage state of said second clock phase.

17. The circuit of claim 16 wherein the means for generating first and second clock phases depends on the relative values of said first power supply voltage and said second power supply voltage to provide said first and second clock phases at a high clock rate when said first power supply voltage exceeds said second power supply voltage, and at a low clock rate when said second power supply voltage exceeds said first power supply voltage by a given amount.

18. The circuit of claim 17 wherein said high clock rate is greater than 1 megahertz, and said low clock rate is less than 1 megahertz.

19. An integrated circuit having a clocked voltage comparator comprising:

(1) a first pull-up transistor serially connected between a first input and a voltage-dropping means, with said voltage-dropping means being serially connected with a first pull-down transistor at a first node, and with the control terminals of the first pull-up and pull-down transistors being coupled to a first clock phase source;

(2) a second pull-up transistor serially connected between a second input and a switching transistor, with said switching transistor being serially connected to a second pull-down transistor at an output node, with the control terminals of the second pull-up and pull-down transistors being coupled to a second clock phase source; and wherein the control terminal of the switching transistor is coupled to said first node.

20. The integrated circuit of claim 19 wherein said first and second pull-up transistors are p-channel field effect transistors, and said first and second pull-down transistors are n-channel field effect transistors.

21. The integrated circuit of claim 20 wherein said first voltage-dropping means is a p-channel field effect transistor having its gate connected to its drain.

22. The integrated circuit of claim 20 wherein said switching transistor is a p-channel field effect transistor.

23. The integrated circuit of claim 20 wherein the low voltage stage of said first clock phase overlaps the low voltage state of said second clock phase.

24. The integrated circuit of claim 1 wherein said comparator output signal is provided to a power source switch that selectively connects either said first source or said second source to a load.

25. The integrated circuit of claim 24 wherein said load includes at least one integrated circuit.

26. The integrated circuit of claim 24 wherein said load is a portion of an integrated circuit.

27. The system of claim 8 wherein said comparator output signal is provided to a power source switch that selectively connects either said primary power source or said backup power source to a load.

28. The system of claim 27 wherein said load includes at least one integrated circuit.

29. The system of claim 27 wherein said load is a portion of an integrated circuit.

* * * * *